United States Patent [19]

Kitamura

[11] Patent Number: 5,153,973
[45] Date of Patent: Oct. 13, 1992

[54] WORK CHANGER

[75] Inventor: Koichiro Kitamura, Toyama, Japan

[73] Assignee: Kitamura Machinery Co., Ltd., Japan

[21] Appl. No.: 604,011

[22] Filed: Oct. 25, 1990

[51] Int. Cl.⁵ ............................. B23Q 7/04; B23Q 7/10
[52] U.S. Cl. ....................... 29/33 P; 29/563;
      82/125; 414/736; 414/744.5; 414/744.7
[58] Field of Search ............. 29/563, 568, 33 P;
      414/225, 736, 738, 744.5, 744.7, 744.8, 762,
      763, 776, 928; 901/36, 37, 39; 82/124, 125;
      51/DIG. 15

[56] References Cited

U.S. PATENT DOCUMENTS

| | | | |
|---|---|---|---|
| 4,119,213 | 10/1978 | Sato et al. | 29/568 X |
| 4,372,728 | 2/1983 | Murakami | 29/568 X |
| 4,832,563 | 5/1989 | Massmann | 414/736 X |
| 4,890,716 | 1/1990 | Kitamura | 29/33 P |
| 4,890,969 | 1/1990 | Esser | 29/568 X |
| 4,985,971 | 1/1991 | Kitamura | 29/33 P |

Primary Examiner—Z. R. Bilinsky
Attorney, Agent, or Firm—Ronald P. Kananen

[57] ABSTRACT

A machine tool includes a table (24) movable in a first direction and a second direction for supporting a work holder (H), a work storage magazine (3) for storing a plurality of work holders (H), and a work changer for transferring work holders (H) between the work storage magazine (3) and the table (24). The axis of the work holder (H) supported in the table (24) is directed in a horizontal direction. Each axis of the work holders (H) stored in the work magazine (3) is directed in a vertical direction. The work changer (5) comprises: a frame (70); a vertical shaft (71) fixedly mounted on the frame (70), the vertical shaft (71) having a first bevel gear (74) fixed thereto; a casing (72) rotatably supported on the vertical shaft (71); a drive device (76-78) for rotating the casing (72) about the vertical shaft (71); a horizontal shaft rotatably mounted on the casing (72), the horizontal shaft having a second bevel gear (83) engaging with the first bevel gear (74); a finger frame (80) connected to the horizontal shaft (8); a finger unit (5a) mounted on the finger frame (80) and rotatable about its rotation axis, the finger unit (5a) having two pairs of fingers (86b, 86a) each of which grips a work holder (H), the two pairs of fingers (86b, 86a) being arranged symmetrically about the rotation axis of the finger unit (5a); and a drive device for rotating the finger unit (5a). The gear ratio of the second bevel gear (83) to the first bevel gear (74) is 2/1 so that when the casing (72) is rotated about the vertical shaft (71) by 180 degrees the second bevel gear (83) is rotated by 90 degrees.

17 Claims, 16 Drawing Sheets

Fig. 15
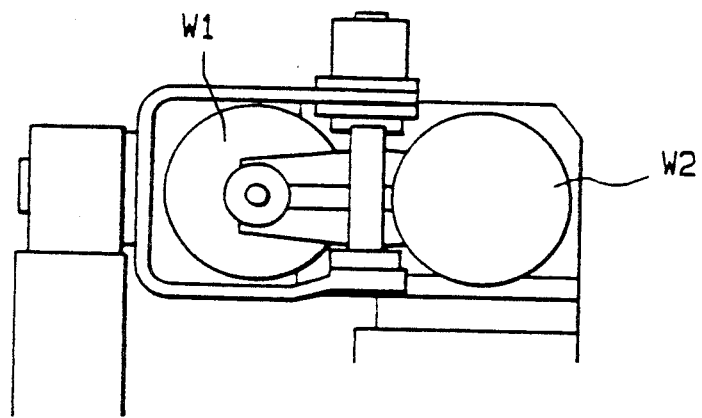
Fig. 16
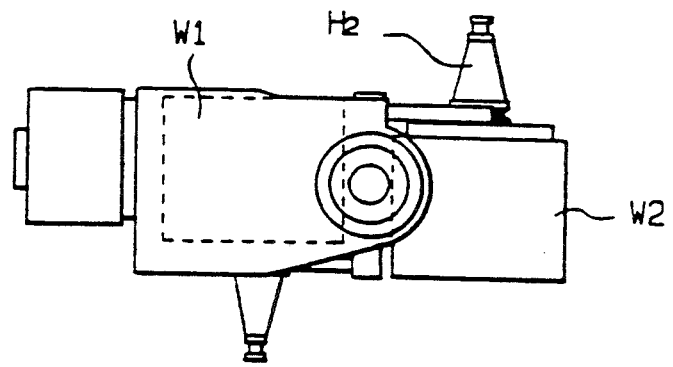

WORK CHANGER

BACKGROUND OF THE INVENTION

This invention relates to a work changer for changing work holders, each having a workpiece attached thereon between a work storage magazine and a machine tool or a machining center having a table to which a work holder is detachably attached in a horizontal direction.

In a conventional work storage magazine, a plurality of work holders, each having a workpiece attached thereon, are stored along a horizontal doughnut-shaped orbit. Each axis of the work holders stored in the work magazine is directed in a vertical direction.

In a certain type of machine tool, a work holder is held on the table along a horizontal direction.

A work holder vertically stored in the work storage magazine is detached therefrom and transferred to the table by a work changer in such a manner that the work holder rotates so as to be directed in a horizontal direction.

On the other hand, the work holder horizontally set in the table is detached therefrom and transferred to the work magazine by the work changer in such a manner that the work holder rotates so as to be directed in a vertical direction.

Because of many drive mechanisms and drive means for the above-stated operations, the conventional work changer is large in scale and complicated in construction, so that many problems can occur.

SUMMARY OF THE INVENTION

The object of this invention is to provide a work changer which is simple in construction and has a small number of drive means and which can quickly exchange a machined workpiece for a new workpiece to be machined.

According to this invention, there is provided a machine tool including a table movable in a first direction and a second direction for supporting a work holder holding a workpiece attached thereto, a work storage magazine for storing a plurality of work holders, and a work changer means for transferring the work holders between the work storage magazine and the table. The axis of the work holder supported in the table is directed in a horizontal direction. Each axis of the work holders stored in the work storage magazine is directed in a vertical direction. The work changer means includes a first changer and a second changer. The second changer comprises: a frame; a vertical shaft fixedly mounted on the frame, the vertical shaft having a first bevel gear fixed thereto; a casing rotatably supported on the vertical shaft; a drive means for rotating the casing about the vertical shaft; a horizontal shaft rotatably mounted on the casing, the horizontal shaft having a second bevel gear fixed thereto and engaging with the first bevel gear, the gear ratio of the second bevel gear to the first bevel gear being 2/1, so that when the casing is rotated about the vertical shaft by 180 degrees, the second bevel gear is rotated by 90 degrees; a finger frame connected to the horizontal shaft; a finger unit mounted on the finger frame and rotatable about its rotation axis, the finger unit having two pairs of fingers each of which grips a work holder by means of a spring force, the two pairs of fingers being arranged symmetrically about the rotation axis of the finger unit; and a drive means for rotating the finger unit.

When the casing is rotated about the vertical shaft by 180 degrees, the finger unit is rotated about the horizontal shaft by 90 degrees so that a work holder vertically held by the finger unit is rotated so as to be directed in a horizontal direction. On the other hand, a work holder horizontally held by the finger unit is rotated so as to be directed in a vertical direction.

The work changer preferably includes an auxiliary changer located in the vicinity of the work magazine. The auxiliary changer comprises: a finger bracket movable in a vertical direction and in a horizontal direction, a first drive means for transferring the finger bracket in the vertical direction, a second drive means for transferring the finger bracket in the horizontal direction, a pair of fingers pivotably attached to the finger bracket for gripping a work holder, and a means attached to the finger bracket for actuating the pair of fingers.

Operation of the work changer which includes two changers, or the main and auxiliary changers, will be briefly explained.

A work holder vertically set in the work magazine is drawn out therefrom by the auxiliary changer and transferred to the main changer. The work holder held by the main changer with its axis being directed in a vertical direction is rotated so as to be directed in a horizontal direction and then inserted into the table along the horizontal direction. Thus, the work holder holding a workpiece to be machined is transferred from the work magazine to the table.

A work holder set in the table with its axis being directed in the horizontal direction is drawn out therefrom by the main changer and then transferred to the auxiliary changer. During this transfer, the work holder with its axis being directed in the horizontal direction is rotated so as to be directed in a vertical direction. Then the work holder is transferred by the auxiliary changer to the work magazine. Thus, the work holder holding a machined workpiece is transferred from the table to the work magazine.

A machining center according to this invention is simple in construction and can quickly change work holders.

BRIEF DESCRIPTION OF THE DRAWINGS

FIGS. 8-24 are views showing a sequence of operations of the work changer.

EMBODIMENTS

Figure 1:
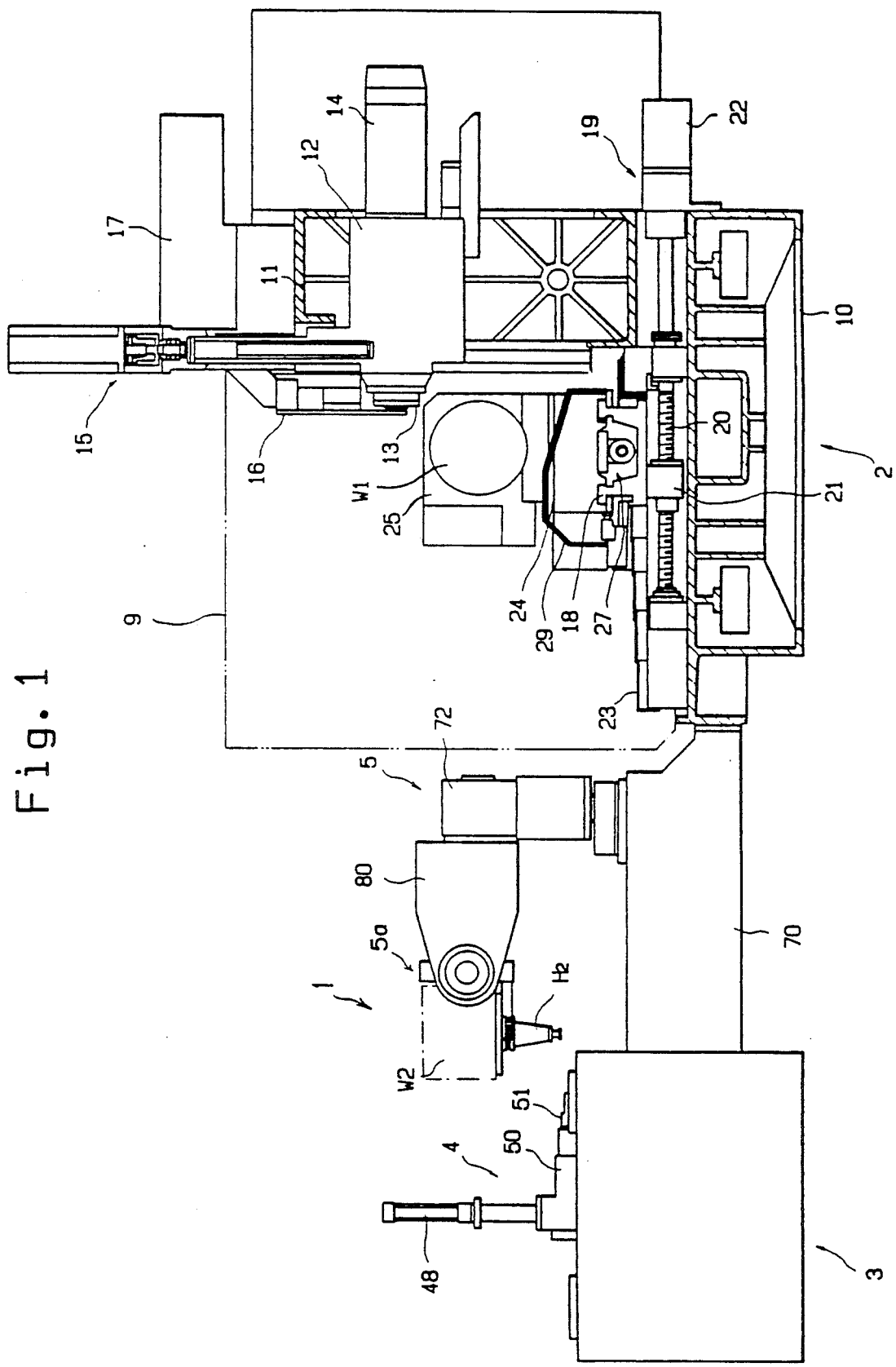
FIG. 1 is a partially broken front view showing a machine tool, a work storage magazine and a work changer according to this invention.

FIG. 1 shows a machine tool 2, a work storage magazine 3 and a work changer means 1 according to this invention. The work changer means 1 includes a first or auxiliary changer 4 and a second or main changer 5.

A column 11 is mounted on a bed 10. A spindle head 12 is mounted on the column 11 so as to be movable in a vertical direction. The spindle head 12 is provided with a spindle 13 rotatable about its horizontal axis by a motor 14. The spindle head 12 moves in a vertical direction.

A tool changer 15 is mounted at an upper portion of the column 11. The tool changer 15 has a tool changing arm 16 and can exchange a used tool set in the spindle 13 for a new tool set in an endless type tool storage magazine 17. As the tool changing arm 16 and the tool magazine 17 are conventional, their detailed constructions are not shown in the drawings.

A saddle 18 is movably mounted above the bed 10. The saddle 18 can be moved in a first direction by a drive means which comprises a feed screw 20 supported by bearings placed at both ends thereof, a nut 21 fixed relative to the saddle 18 and a motor 22 for rotating the feed screw 20.

Slide covers 23 are telescopically arranged at both sides of the saddle 18. When the saddle 18 moves in the first direction, the covers 23 telescopes so as to prevent oil or tips from entering the inside.

A table 24 is movably mounted on the saddle 18. The table 24 can be moved in a second direction perpendicular to the first direction by a drive means 27 which is the same in construction as said drive means 20, 21, 22.

Slide covers 29 are telescopically arranged at both sides of the table 24.

Figure 2:
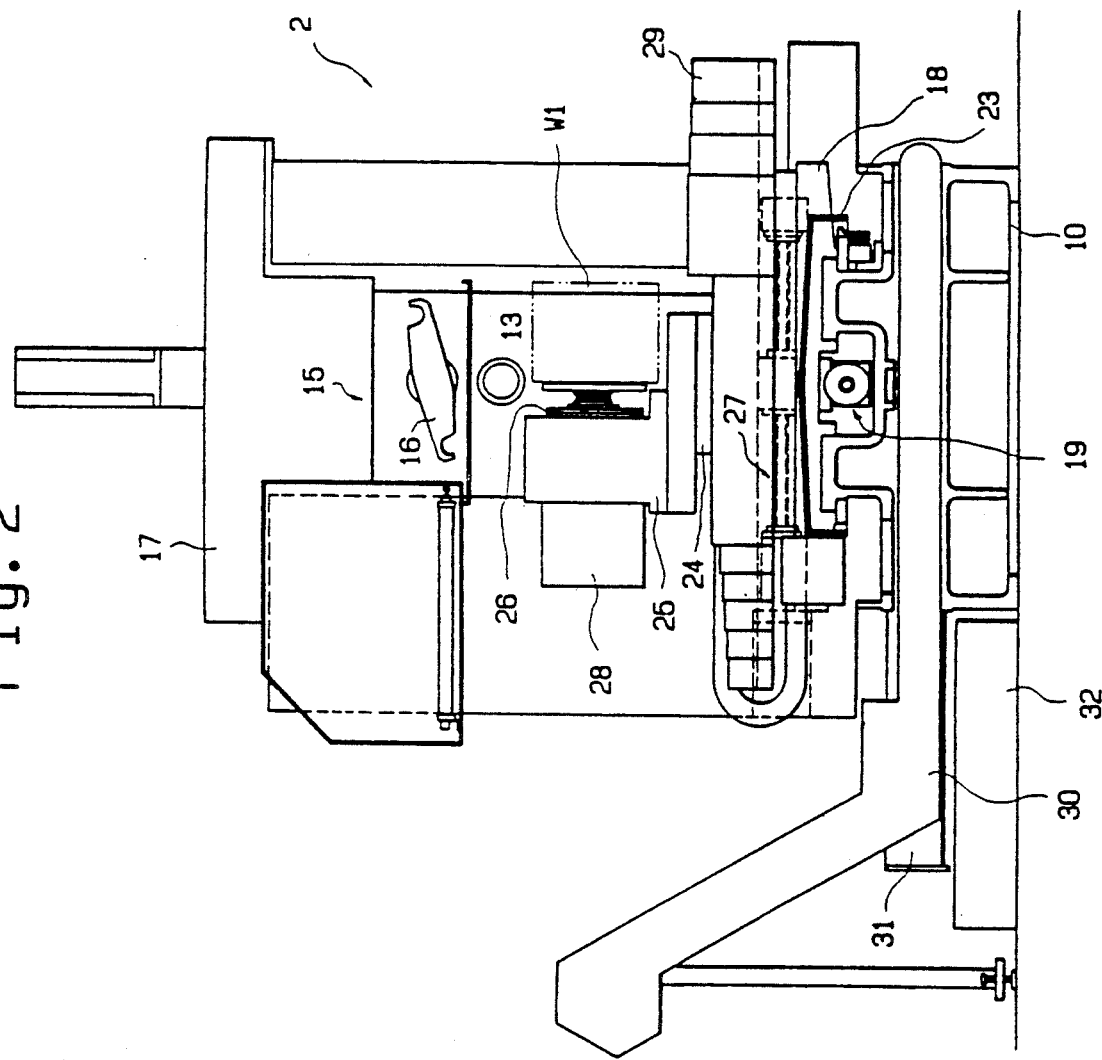
FIG. 2 is a side view showing the machine tool of FIG. 1.

A rotary stage 25 is mounted on the table 24. The rotary stage 25 can be indexed about a vertical axis by a drive means (not shown). As shown in FIG. 2, the rotary stage 25 has a L-shaped configuration in a side view and has a work spindle 26 horizontally mounted therein. The work spindle 26 can be rotated about its horizontal axis by means of a motor 28. A work holder H1, holding a workiece W1, is horizontally held in the spindle 26.

The bed 10 has a conveyor 30, a cutting oil trough 31 and an oil tank 32. Outside the machine tool 2, a chip guard 9 is attached as shown in FIG. 1.

Figure 7:
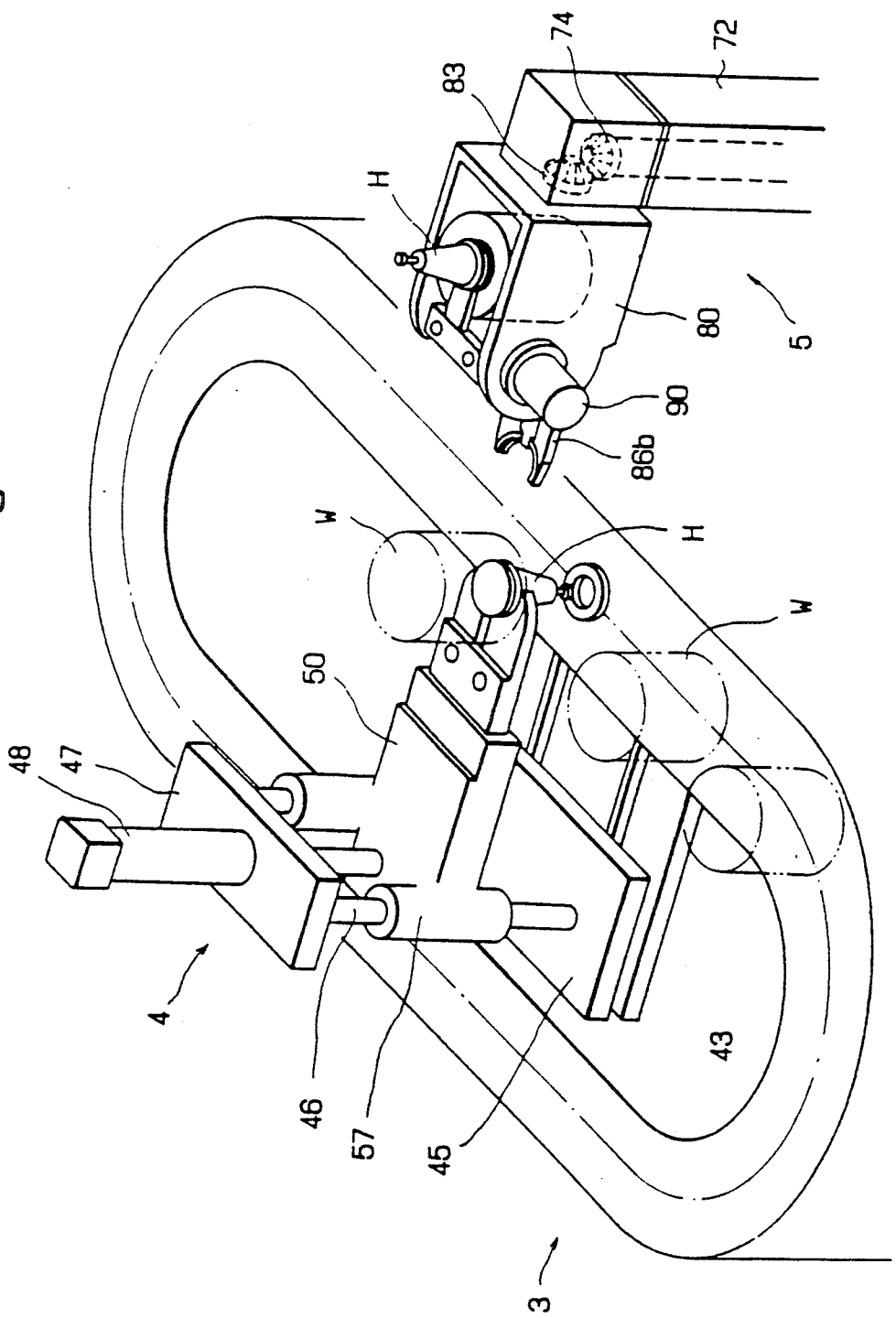
FIG. 7 is a schematic perspective view showing the work magazine and the work changer.

FIG. 7 is a schematic perspective view showing the work storage magazine 3 and two changers 4, 5. The work storage magazine 3 has an endless doughnut-shaped orbit in which a plurality of work holders are stored. The first changer 4 is located at the center of the upper portion of the work magazine 3.

A plurality of work holders H are set in the endless orbit of the work storage magazine 3 and can be transferred along the orbit. Each axis of the work holders H set in the work storage magazine is directed in a vertical direction. The work magazine 3 has a detecting means 40 for detecting a predetermined position of a specific work holder during an indexing operation.

Figure 5:
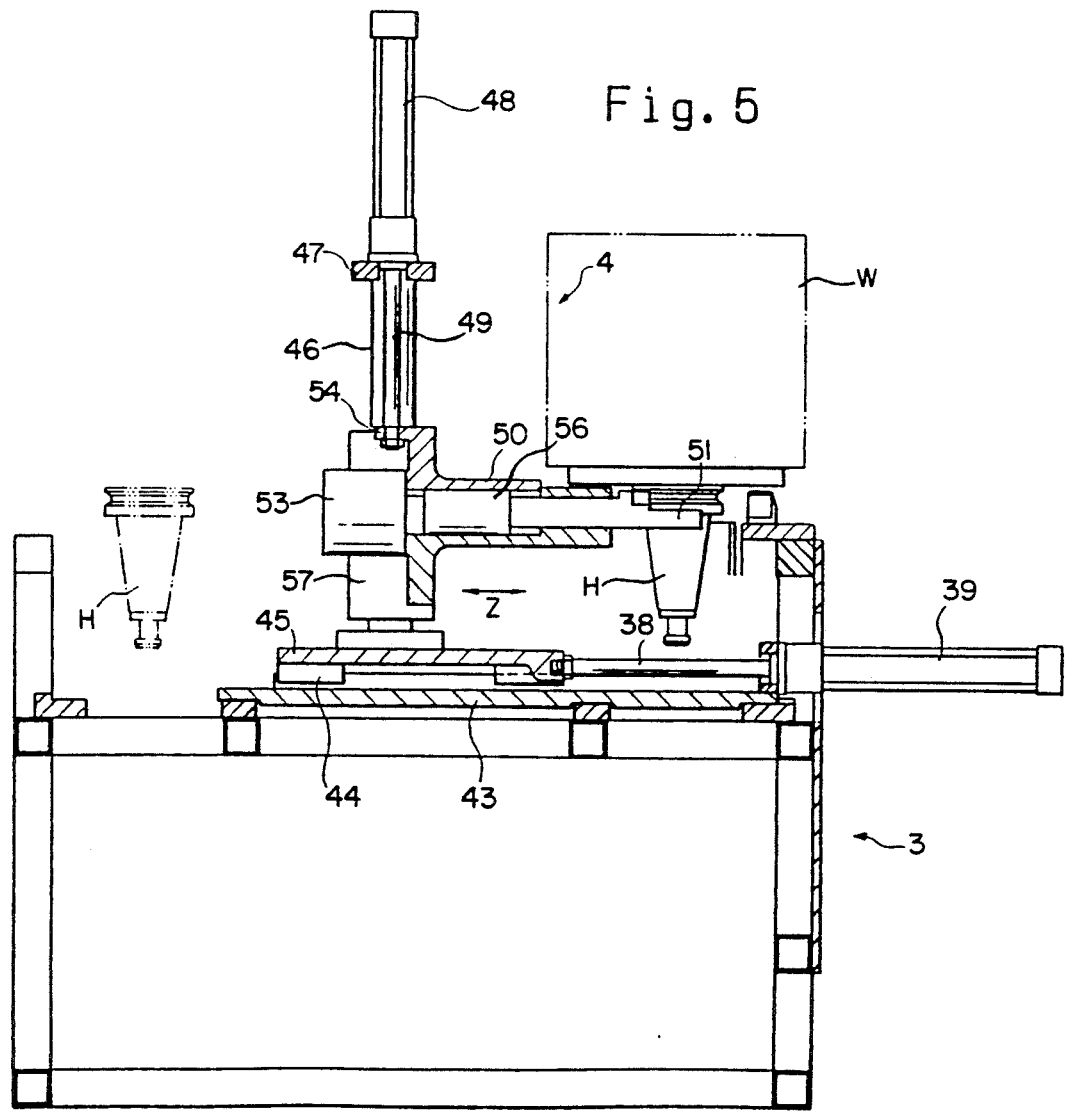
FIG. 5 is a partially broken plan view showing the work storage magazine and a first changer.
Figure 6:
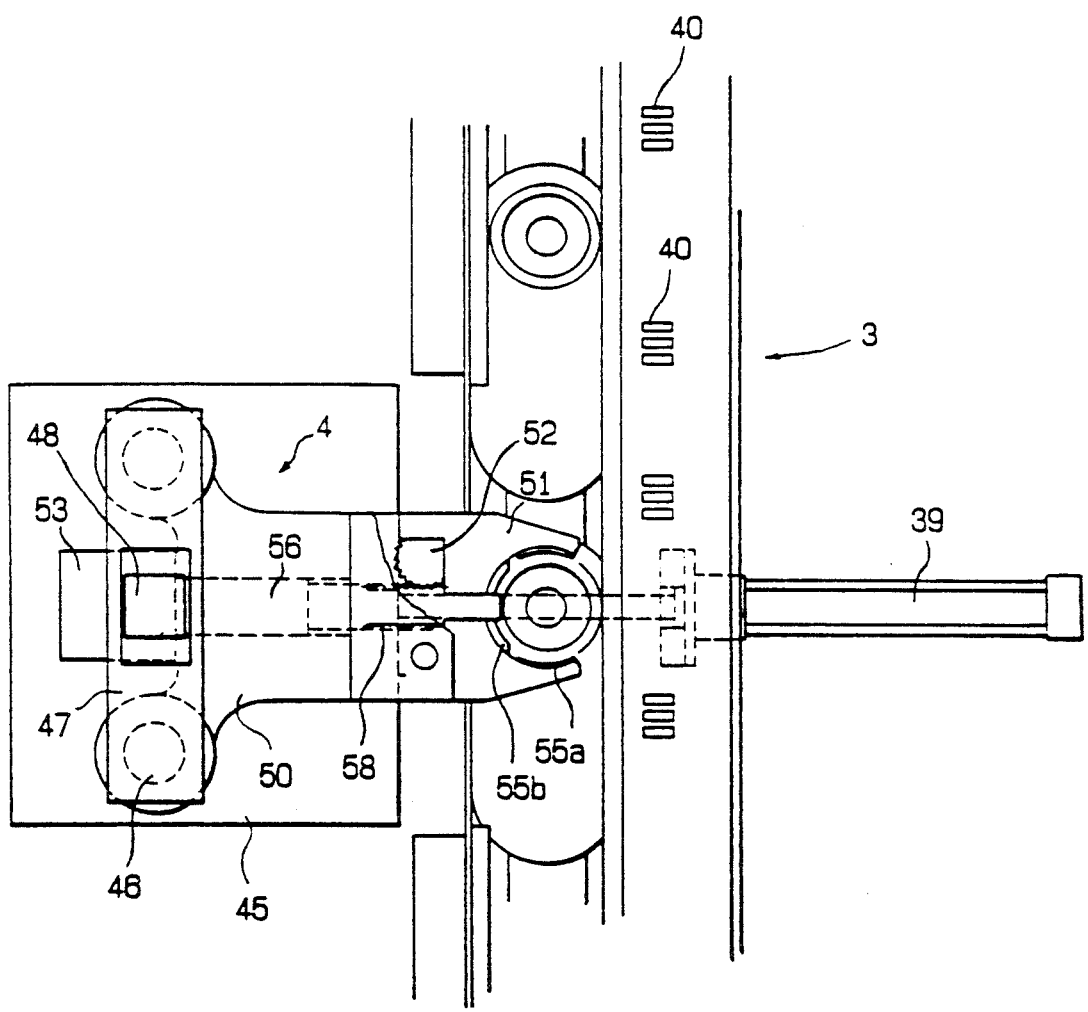
FIG. 6 is a top view showing a part of the work storage magazine and the first changer.

The first changer 4 will be explained with reference to FIGS. 5 and 6. A guide base 43 is fixed to the upper portion of the work storage magazine 3. The guide base 43 has two grooves each extending along the first direction. A slide base 45 is slidably mounted on the guide base 43 and has a linear way 44 fixed at an underside thereof and cooperating with said grooves. A cylinder means 39 is fixed relative to the frame of the work magazine 3 and its rod 38 is connected to the slide base 45. When the cylinder means 39 is actuated, the slide base 45 is moved in the first direction (Z).

Two cylindrical guide rods 46 are vertically mounted on the slide base 45. A connecting plate 47 is fixedly spanned between the tops of the two guide rods 46. A hydraulic cylinder means 48 parallel to the guide rods 46 is located on the connecting plate 47.

A finger bracket 50 is mounted on the guide rods 46 and slidable along the same in a vertical direction. Two cylindrical guide bodies 57 each having a through-hole, are fixed at the rear end of the finger bracket 50. Each guide rod 46 passes through the through-hole of the guide body 57 so that the finger bracket 50 can slide along the guide rod 46. The finger bracket 50 is provided with a pair of fingers for gripping a work holder H, each of which is pivotably mounted at the other end of the finger bracket 50.

The finger bracket 50 has a rod bracket 54 formed at an intermediate portion between the two guide bodies 57. A rod 49 of the hydraulic cylinder means 48 is connected to the rod bracket 54. The finger bracket 50 can be moved vertically by the hydraulic cylinder means 48. Each fingers 51 has an arc-shaped portion 55a, 55b formed at the end thereof and corresponding in shape to the work holder H for supporting the same. A pinion 52 is attached to the other end of each fingers 51 in a conventional manner so that the fingers 51 pivot about the rotation axes of the pinions 52. Between the two guide bodies 57 and below the rod bracket 54 is located a thin hydraulic cylinder 53. A shaft 56 having two racks formed at both sides thereof is connected to a rod of the cylinder means 53. Each of the racks 58 engages with one of pinions 52 attached to the fingers 51. When the shaft 56 is moved on the left as shown in FIG. 6 by the cylinder means 53, the fingers 51 are closed for gripping the work holder H. When the shaft 56 is moved on the right as shown in FIG. 6, the fingers 51 are opened so as to release the work holder H.

As shown in FIG. 1, the second work changer 5 is located between the table 24 and the first changer 4 so as to transfer the work holders H therebetween.

Figure 3:
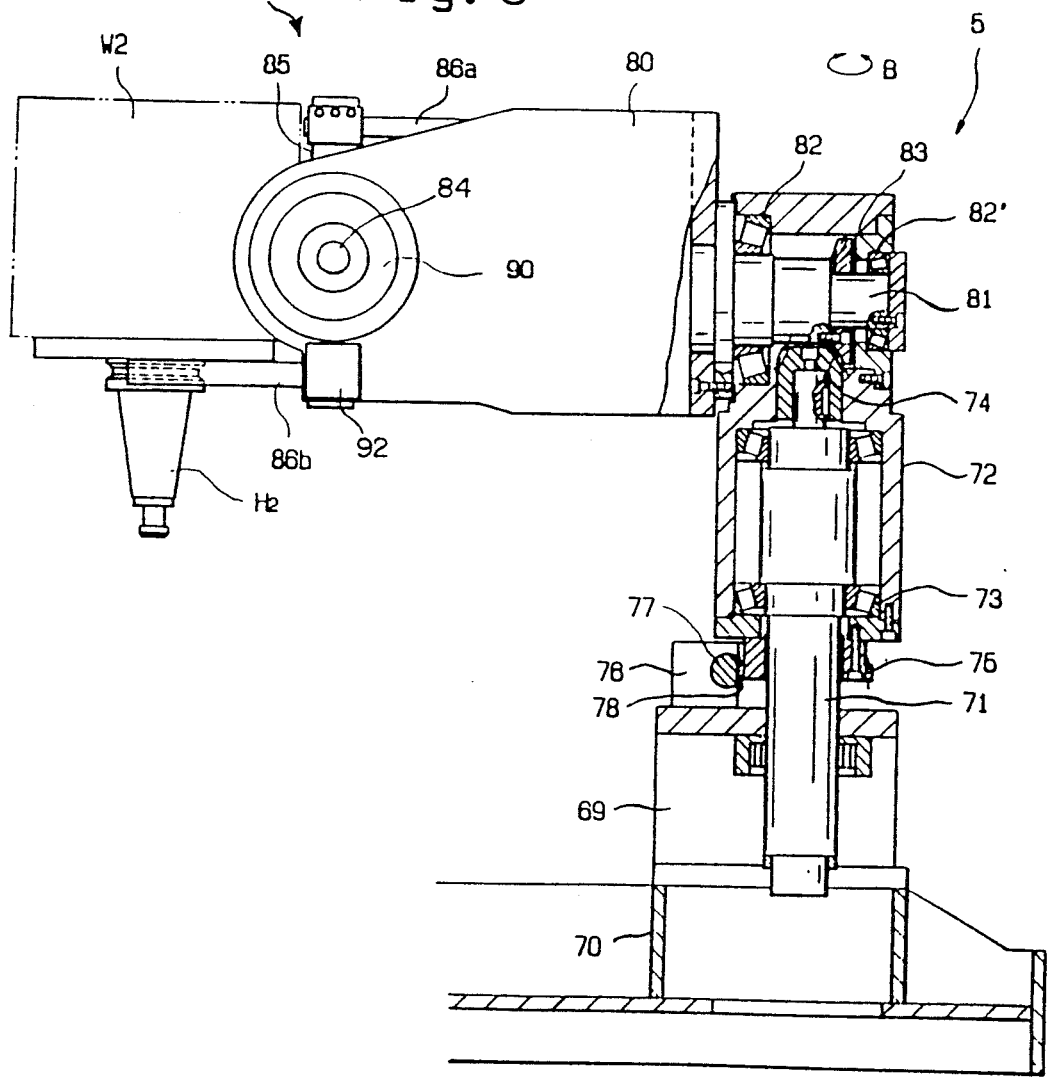
FIG. 3 is a partially broken side view showing a second changer.

The second changer 5 will be explained in detail with reference to FIGS. 3 and 4. A vertical shaft 71 is fixedly mounted on a changer setting base 69 formed on the upper portion of the frame 70. The vertical shaft 71 has a bevel gear 74 fixed at the top thereof.

A generally cylindrical or polygonal hollow casing 72 is mounted to rotate on and about the vertical shaft 71 via bearings 73. The upper half portion of the shaft 71 is surrounded by the hollow casing 72. The lower portion of the shaft 71 is received into the base 69. A spur gear 75 spaced from the top of the base 69 is formed at the bottom of the casing 72.

A cylinder means is horizontally placed on the changer setting base 69. A rod 77 of the cylinder has a rack 78 formed at its side and engaged with the spur gear 75. When the rod 77 is reciprocated by the cylinder 76, the spur gear 75, and consequently the casing 72, are rotated about the vertical shaft 71 as shown by the arrow B.

A horizontal shaft 81 is rotatably mounted via bearings 82, 82' at the upper portion of the casing 72 and above the vertical shaft 71. A finger frame 80 is connected to the horizontal shaft 81. A bevel gear 83 is fixed to the horizontal shaft 81. The bevel gear 83 engages with the bevel gear 74 of the horizontal shaft 71. The number of teeth the bevel gear 83 is twice as many as that of the bevel gear 74 so that, when the bevel gear 74 is rotated by 180 degrees, the bevel gear 83 is rotated by 90 degrees. In other words, the gear ratio of the bevel gear 83 to the bevel gear 74 is selected to be 2/1. As shown in FIGS. 3 and 4, the finger frame 80 is formed by two side plates and a rear plate connected to the free end of the horizontal shaft 81.

A rotary unit 5a is rotatably mounted on the finger frame 80. The rotary unit 5a includes a finger shaft 84 rotatably mounted at an end of the finger frame 80 and two pairs of fingers 86a, 86b each of which grips one work holder H. The finger shaft is arranged so as to be perpendicular to a plane defined by both the horizontal shaft 81 and the vertical shaft 71. The finger shaft 84 can be rotated by a hydraulic motor or rotor 90 mounted on the finger frame 80.

The two pairs of fingers are attached on a rotary bracket 85 connected to the finger shaft 84. The two pairs of fingers 86a, 86b are arranged symmetrically relative to the finger shaft 84 so as to be in opposite directions to each other. When the work holder H is supported by one pair of fingers 86b so as to direct downwardly, the other work holder H is supported by the other pair of fingers 86a so as to direct upwardly.

A lock plate 87, having two concave portions 87a formed therein, at the end of the rotary bracket 85. At the rear end of each of the fingers 86a, 86b is formed a follower 89 cooperating with the concave portions 87a. The lock plate 87 is connected to a thin air cylinder 92 so as to be moved with a predetermined stroke in the direction of the arrow X. The lock plate 87 is biased in one direction by a spring 88. A biasing spring 91 is attached between each of the pairs of fingers 86a, 86b.

When the lock plate 87 is moved by the air cylinder means 92 so that the concave portions 87a align with the corresponding followers 89, the fingers 86b are unlocked. In this condition, the fingers 86b can be opened by rotation in the direction of the arrows Y for gripping or releasing the work holder H. On the other hand, when the followers 89 are out of the concave portions 87a as shown in FIG. 4, the fingers 87a are locked in a closed condition for firmly holding the work holder H.

Figure 4:
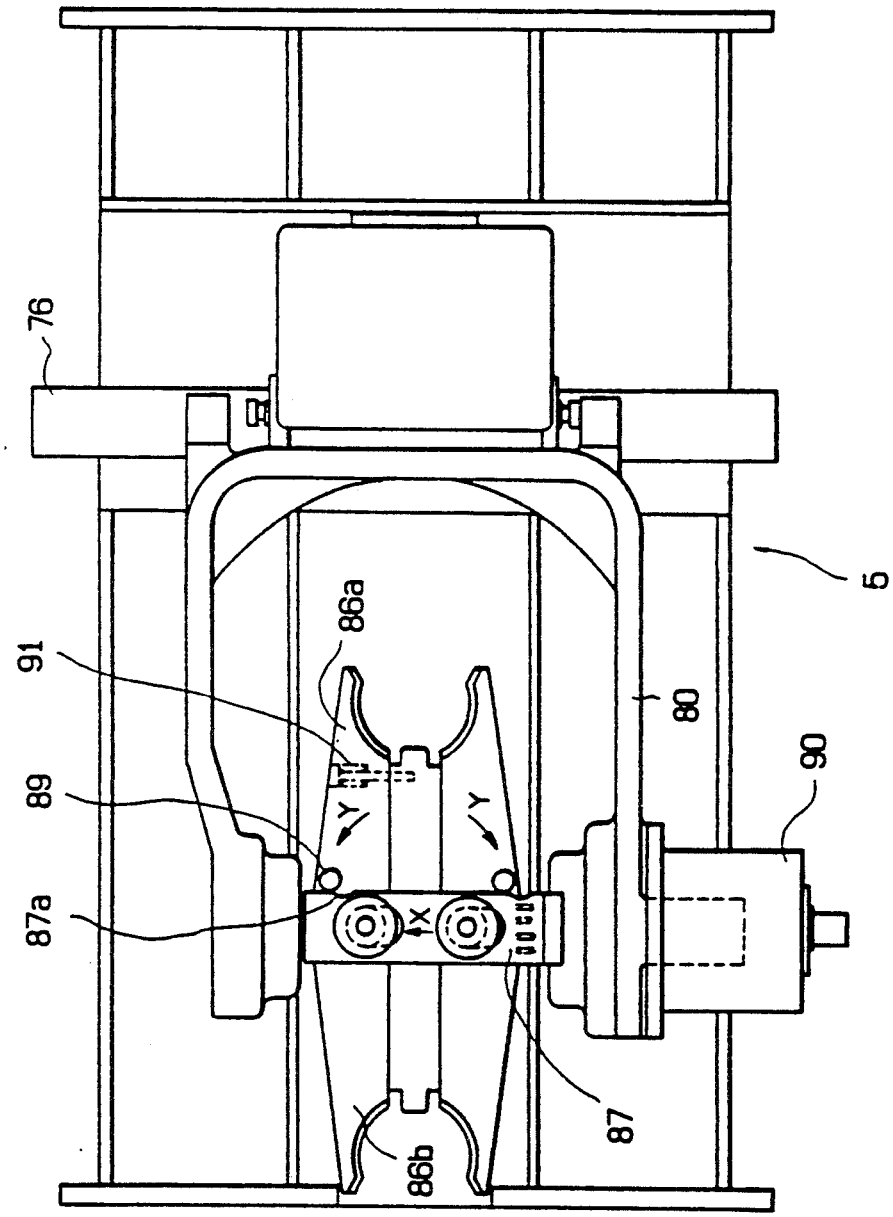
FIG. 4 is a top view of the second changer.

Thus, the lock plate 87 locks the followers 89 in the position shown in FIG. 4, because the right edge of the lock plate 87 as seen in FIG. 4 contacts or engages the followers 89 so that the fingers 86a cannot move in any direction. When the lock plate 87 moves upwardly in the direction of the arrow X of FIG. 4, the followers 89 enter the concave portions 87a whereby the fingers 86a can move or rotate in the opening directions shown by the arrows Y. In other words, the fingers 86a are unlocked.

Now the operation of the work changer 1 will be explained with reference to FIGS. 8 to 24.

Figure 8:
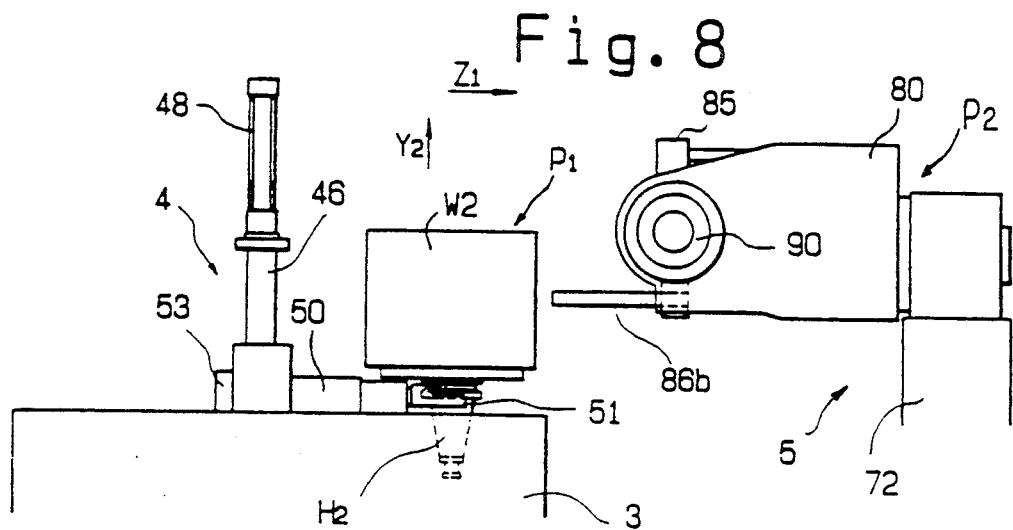

In FIG. 8, a plurality of work holders H stored in the work magazine 3 are transferred along the orbit for indexing the predetermined work holder H2, which holds a workpiece W2 to be machined, at the work changing position P1. For the indexing purpose, the conventional index means 40 is utilized. The finger bracket 50 is moved in a direction Z1 from a retreated position to a position shown in FIG. 8 in which the fingers 51 can grip the work holder H2. Before moving the finger bracket 50 the fingers 51 are opened by the hydrauric cylinder 53. Then the fingers 51 are closed for gripping the work holder H2. The second work changer 5 is transferred to the waiting position P2. The finger bracket 50 is lifted in a direction Y2 by the cylinder 48 and then moved in the direction Z1 by the cylinder 39.

Figure 9:
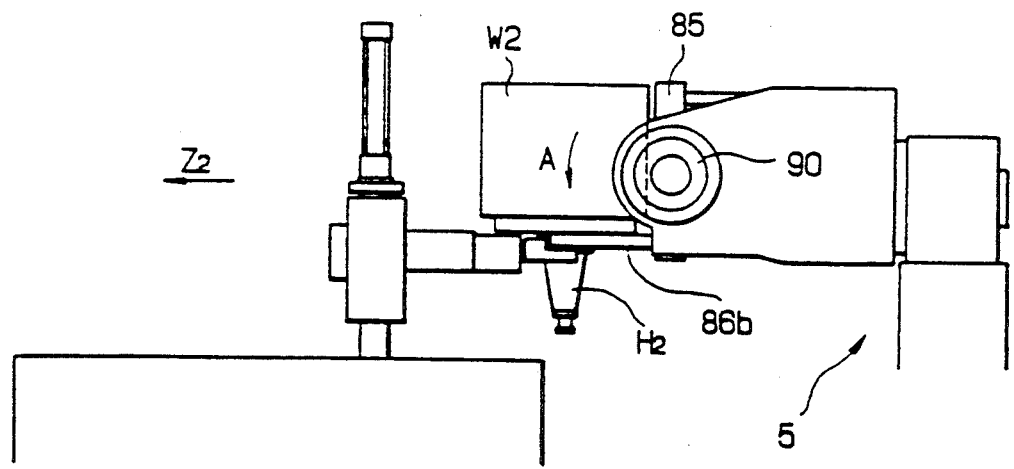

In FIG. 9, when the finger bracket 50 is moved to a position shown in FIG. 9 in which the work holder H2 holding the workpiece W2 is inserted between the fingers 86b of the second work changer 5. Prior to this insertion, the fingers 86b are unlocked, and the fingers 86b are then locked for gripping the work holder H2. The hydraulic cylinder 53 is operated so as to open the fingers 51. The rotary bracket 85 is retreated in a direction Z2. Next, the motor 90 is operated so that the rotary unit 5a or the bracket 85 is rotated by 180 degrees.

Figure 10:
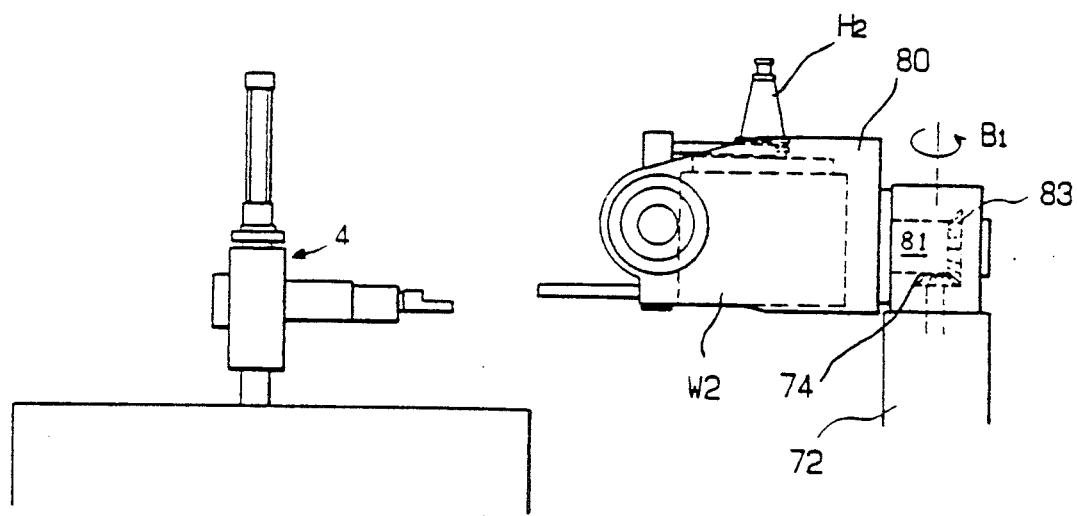

In FIG. 10 the rod 77 of the cylinder 76 is expanded so that the spur gear 75, engaging the rack 78 and the casing 72, are rotated by 180 degrees in a direction B1. Simultaneously the finger frame 80 is rotated about the horizontal shaft 81 by 90 degrees because the bevel gear 83 engaging the bevel gear 74, is rotated by 90 degrees. During this step, the work holder H2, being directed in a vertical direction as shown in FIG. 10, is rotated so as to be directed in a horizontal direction as shown in FIG. 11.

Figure 11:
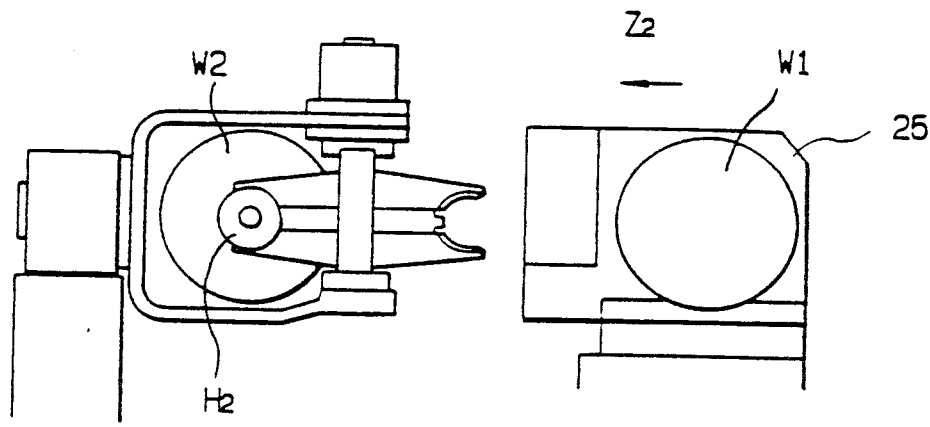
Figure 12:
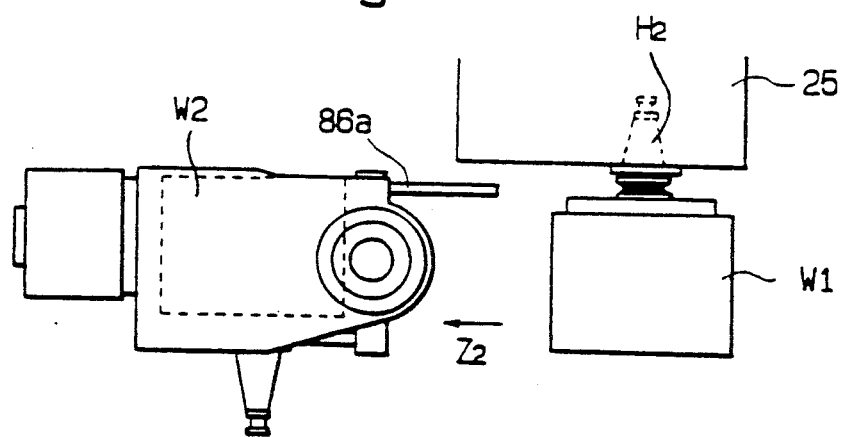

As shown in FIGS. 11 and 12, the work holder H2 is transferred in the illustrated position. The rotary stage 25, in which a work holder H1 with a machined workpiece W1 is held, is transferred at a position where the work holder H1 aligns with the fingers 86a of the second changer 5 as shown in FIGS. 11 and 12. Then the rotary stage 25 is transferred in the direction Z2.

Figure 13:
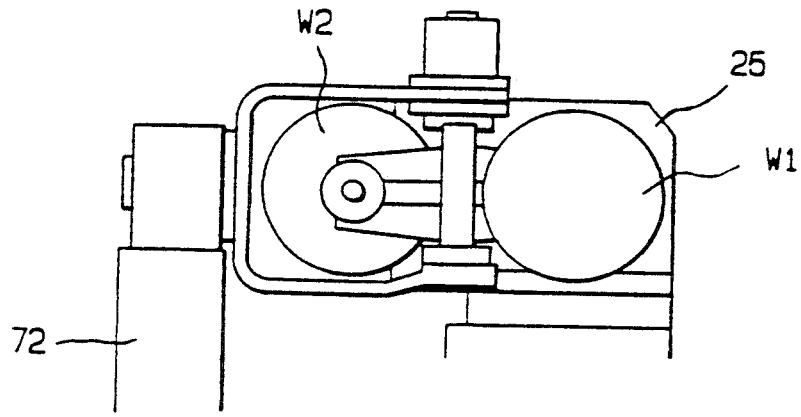
Figure 14:
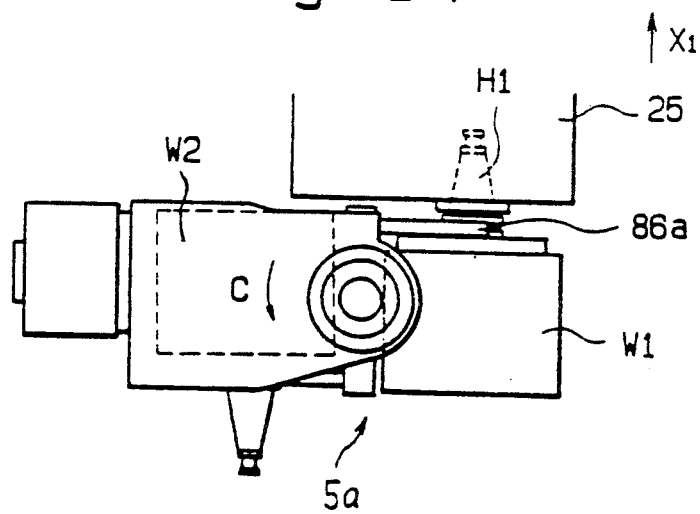

As shown in FIGS. 13 and 14, the rotary stage 25 is transferred in the direction Z2 until the work holder H1 is inserted between the fingers 86b of the second changer. The fingers 86b are then locked by operating the air cylinder 92.

Next, the rotary stage 25 is transferred in a direction X1 so that the work holder H1 is drawn from the rotary table 24. Prior to this step, the work holder H1 is unclamped at the rotary table 24 by operating a draw-bar (not shown) or the like.

When the work holder H1 is completely drawn from the table 24, the motor 90 is operated so that the rotary unit 5a is rotated by 180 degrees in a direction C. By this rotation, two positions of the two work holders H1 and H2 are interchanged.

In FIGS. 15 and 16, the rotary stage 25 is transferred in the direction X2.

Figure 17:
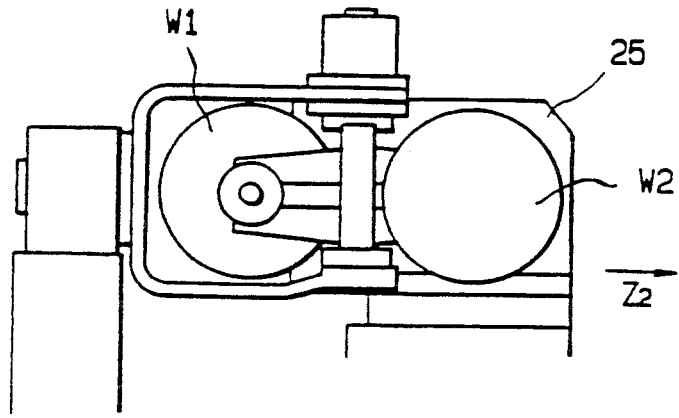
Figure 18:
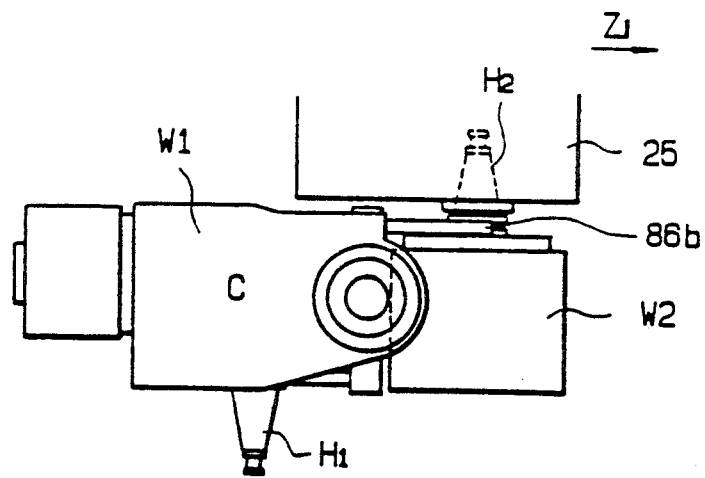

In FIGS. 17 and 18, the rotary stage 25 is transferred until the work holder H2 is completely set in the same. Then the work holder H2 is clamped at the table 24 by the draw-bar (not shown)

and the fingers 86b are unlocked. Next the rotary stage 25 is transferred in the direction Z1.

Figure 19:
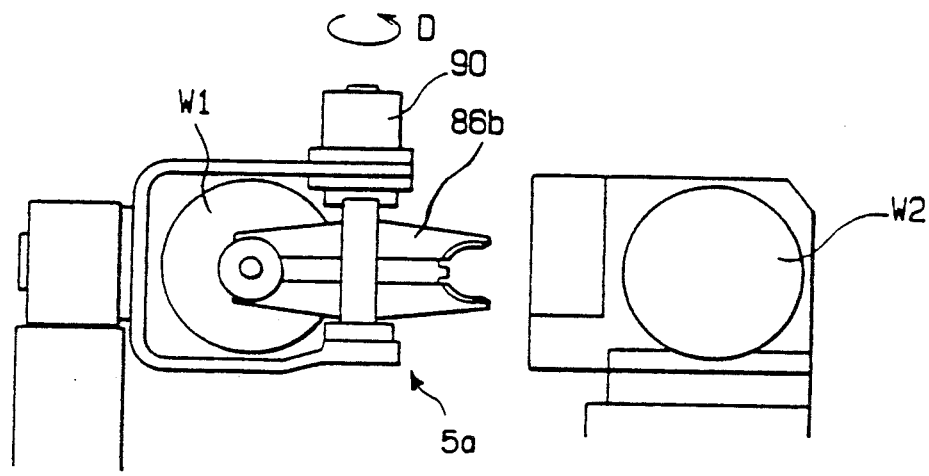

In FIG. 19, when the rotary stage 25 is fully transferred in the direction Z1, the motor 90 is operated so that the rotary unit 5a is rotated by 180 degrees.

Figure 20:
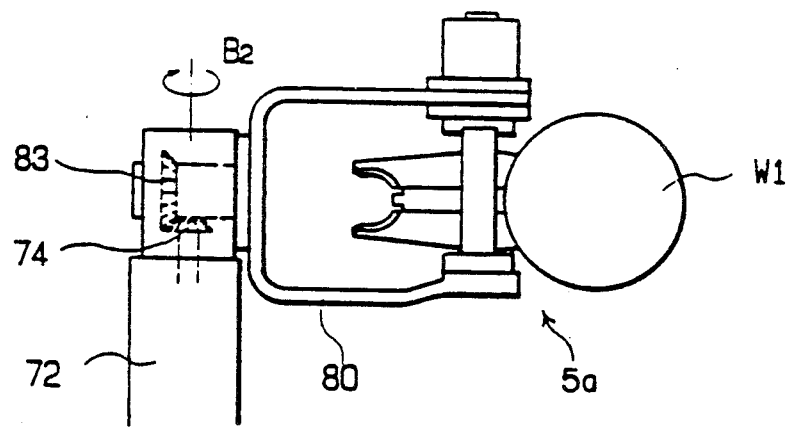

In FIG. 20, the workpiece W1 attached to the work holder H1 is moved in such a position as shown in FIG. 20. The rod 77 is contracted so that the casing 72 is rotated by 180 degrees in a direction B2. Simultaneously, the finger frame 80 is rotated about the horizontal shaft 81 by 90 degrees because the bevel gear 83 engaging the bevel gear 74 is rotated by the same angle. During this step, the work holder H2, directed horizontally as shown in FIG. 20, is rotated so as to be directed in the vertical direction as shown in FIG. 21.

Figure 21:
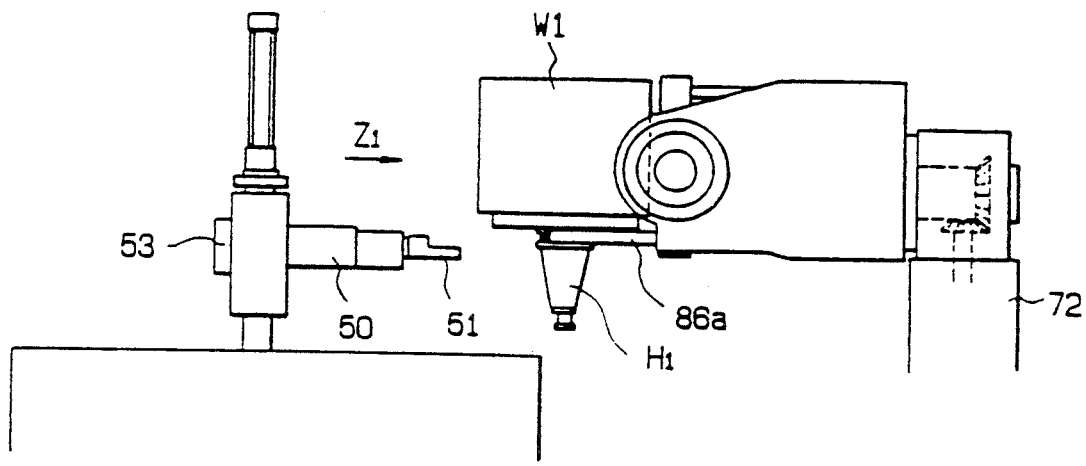

In FIG. 21, the work holder H1 is moved in such a position as shown in FIG. 21. The finger bracket 50 of the first work changer 4 is transferred in the direction Z1, in which the fingers 51 are opened.

Figure 22:
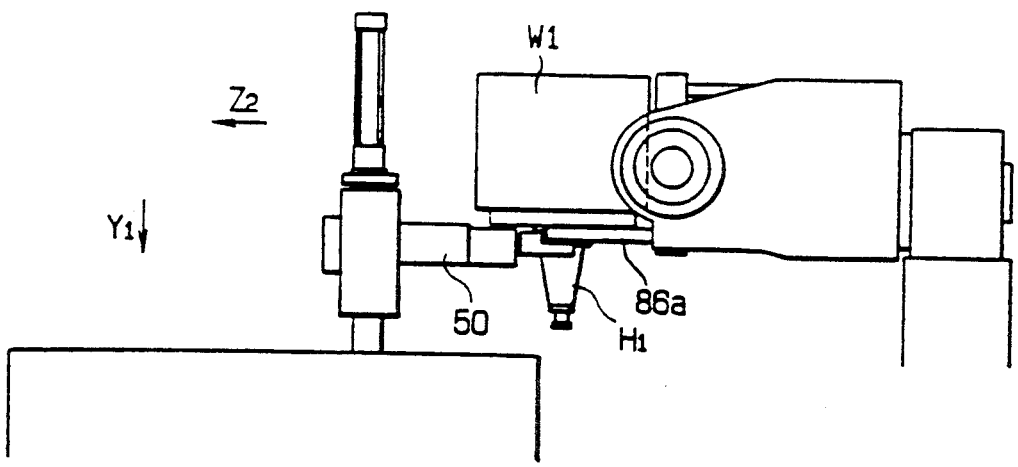

In FIG. 22, when the finger bracket 50 is transferred to the position shown in FIG. 22, the fingers 51 are closed so as to grip the work holder H1 and the fingers 86a are unlocked. The finger bracket 50 is transferred in a direction Z2 and then in a direction Y1 so that the work holder H1 is stored at a predetermined position within the orbit of the work magazine 3.

Figure 23:
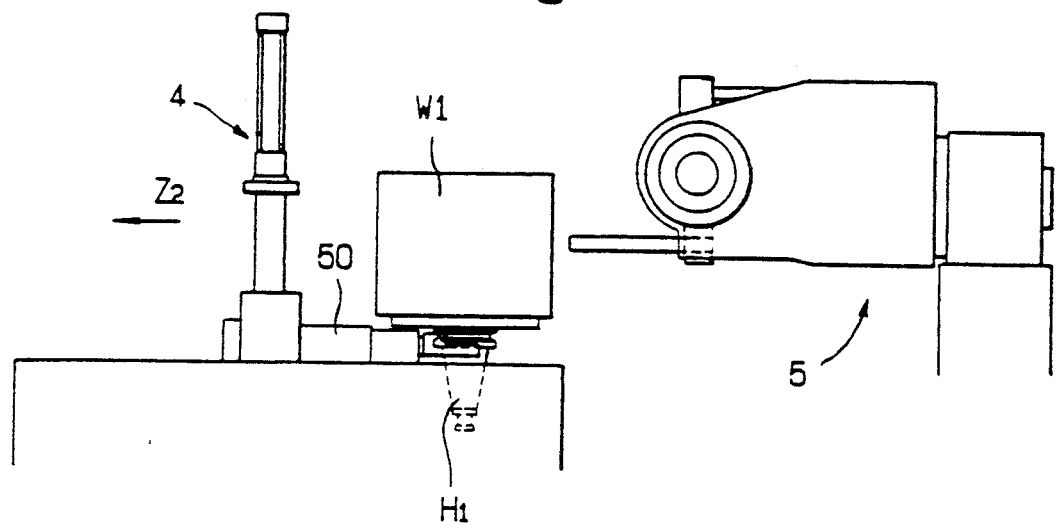

In FIG. 23, the work holder H1 is stored in the work magazine 3. The fingers 51 are opened, and the finger bracket 50 is transferred in the direction Z2 so as to carry out the indexing operation of the work magazine 3.

Figure 24:
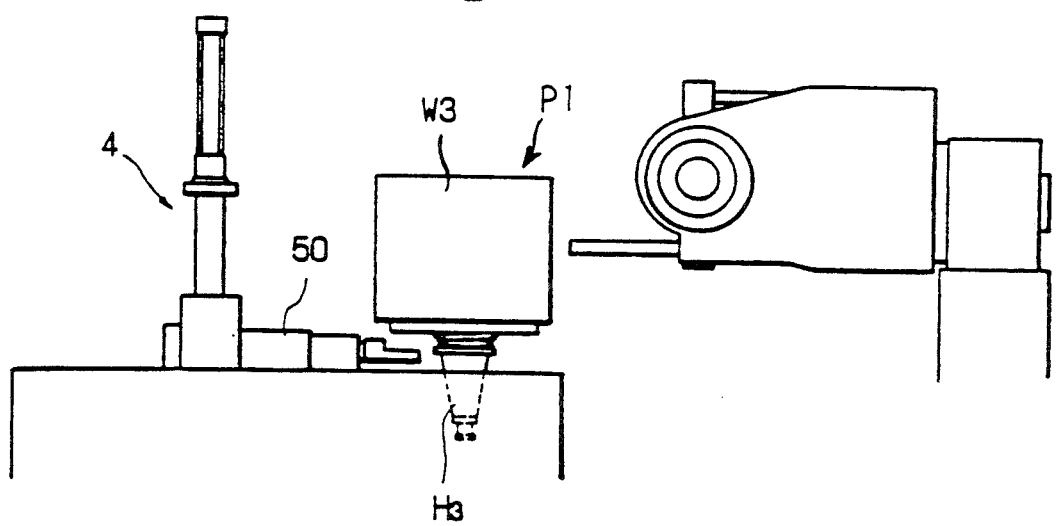

In FIG. 24, the work magazine 3 is operated for the indexing purpose so that a new work holder H3 holding a new work W3 to be machined is indexed at the position P1.

The invention may be embodied in any other specific forms without departing from the spirit or essential characteristics thereof. The disclosed embodiment is therefore to be considered in all respects as illustrative and not restrictive, the scope of the invention being indicated by the appended claims. All changes which come within the meaning and range of equivalency of the claims are therefore intended to be embraced therein.

What is claimed is:

1. A machine tool including a table (24) movable in a first direction and a second direction for supporting a work holder (H) having a workpiece (W) attached thereto, a work storage magazine (3) for storing a plurality of work holders (H), and a work changer means (5) for transferring work holders (H) between the work storage magazine (3) and the table (24), the axis of the work holder (H) supported in the table (24) being directed in a horizontal direction, each axis of the work holders (H) stored in the work storage magazine (3) being directed in a vertical direction, the work changer means (5) comprising:
   a frame (70) located between the work storage magazine (3) and the table (24);
   a vertical shaft (71) fixedly mounted on the frame (70), the vertical shaft (71) having a first bevel gear (74) fixed thereto;
   a casing (72) rotatably supported on the vertical shaft (71);
   a drive means (76-78) for rotating the casing (72) about the vertical shaft (71);
   a horizontal shaft rotatably mounted on the casing (72), the horizontal shaft (81) having a second bevel gear (83) fixed thereto and engaging with the first bevel gear (74), the gear ratio of the second bevel gear (83) to the first bevel gear (74) being 2/1 so that, when the casing (72) is rotated about the vertical shaft (71) by 180 degrees, the second bevel gear (83) is rotated by 90 degrees;
   a finger frame (80) connected to the horizontal shaft (81);
   a finger unit (5a) mounted on the finger frame (80) and rotable about its rotation axis, the finger unit (5a) having two pairs of fingers (86b, 86a) each of which grips a work holder (H) by means of a spring force (91), the two pairs of fingers (86b, 86a) being arranged symmetrically about the rotation axis of the finger unit (5a); and
   a drive means for rotating the finger unit (5a) about its rotation axis.

2. A work changer as defined in claim 1, wherein the drive means for rotating the casing (72) includes a pinion (75) attached to the casing (72), a rack (78) engaging with the pinion (75), and a cylinder means (76) for reciprocating the rack (78).

3. A work changer as defined in claim 1, wherein the horizontal shaft (81) is located above the vertical shaft (71).

4. A work changer as defined in claim 3, wherein the rotation axis of the finger unit (5a) is perpendicular to the axis of the horizontal shaft (81).

5. A work changer as defined in claim 1, wherein the drive means for rotating the finger unit (5a) is a hydraulic rotor (90).

6. A work changer as defined in claim 1, wherein the rotary unit (5a) further includes two locking means (87, 87a, 89, 92) for locking each pairs of fingers (86a, 86b) so as to prevent them from disengaging the work holder (H).

7. A work changer as defined in claim 6, wherein each locking means includes a cam plate (87) movably located at a rear end of the fingers (86a), the plate (87) having two concave portions (87a) formed therein, two followers (89) cooperating with the cam plate (87), each of them being fixed at one of the fingers (86a), and a cylinder means (92) for moving the cam plate (87).

8. A machine tool including a table (24) movable in a first direction and a second direction for supporting a work holder (H) holding a workpiece (W) attached thereto, a work storage magazine (3) for storing a plurality of work holders (H), and a work changer means for transferring work holders (H) between the work storage magazine (3) and the table (24), the axis of the work holder (H) supported in the table (24) being directed in a horizontal direction, each axis of the work holders (H) stored in the work storage magazine (3) being directed in a vertical direction, the work changer means including a first changer (4) located in the vicinity of the work magazine (3) and a second changer (5) located between the first changer (4) and the table (24),
   A) the first changer (4) comprising:
      a finger bracket (50) movable in a vertical direction and in a third direction;
      first drive means (48) for transferring the finger bracket (50) in the vertical direction;
      second drive means (39) for transferring the finger bracket (50) in the third direction;
      a first pair of fingers pivotably attached to the finger bracket (50) for gripping a work holder (H); and
      means (52, 53, 56, 58) attached to the finger bracket (50) for actuating the first pair of fingers,
   B) the second changer (5) comprising:
      a frame (70);
      a vertical shaft (71) fixedly mounted on the frame (70), the vertical shaft (71) having a first bevel gear (74) fixed thereto;
      a casing (72) rotatably supported on the vertical shaft (71);
      third drive means (76-78) for rotating the casing (72) about the vertical shaft (71);
      a horizontal shaft rotatably mounted on the casing (72), the horizontal shaft (81) having a second bevel gear (83) fixed thereto and engaging with the first bevel gear (74), the gear ratio of the second bevel gear (83) to the first bevel gear (74) being 2/1 so that, when the casing (72) is rotated about the vertical shaft (71) by 180 degrees, the second bevel gear (83) is rotated by 90 degrees;
      a finger frame (80) connected to the horizontal shaft (81);
      a finger unit (5a) mounted on the finger frame (80) and rotatable about its rotation axis, the finger unit (5a) having a second and third pairs of fingers (86b, 86a) each of which grips a work holder (H) by means of a spring force (91), the second and third pairs of fingers (86b, 86a) being arranged symmetrically about the rotation axis of the finger unit (5a); and fourth drive means for rotating the finger unit (5a).

9. A work changer as defined in claim 8, wherein the second direction is parallel to the third direction.

10. A work changer as defined in claim 8, wherein the first and second drive means are cylinder means.

11. A work changer as defined in claim 8, wherein the means for actuating the first pair of fingers (51) includes two pinions (52) each attached to the respective first pair of fingers (51), two racks (58) each engaging the pinions (52) and the cylinder means (53) for reciprocating the racks (58).

12. A work changer as defined in claim 8, wherein the third drive means for rotating the casing (72) includes a pinion (75) attached to the casing (72), a rack (78) engaging with the pinion (75), and a cylinder means (76) for reciprocating the rack (78).

13. A work changer as defined in claim 8, wherein the horizontal shaft (81) is located above the vertical shaft (71).

14. A work changer as defined in claim 13, wherein the rotation axis of the finger unit (5a) is perpendicular to the horizontal shaft (81).

15. A work changer as defined in claim 8, wherein the fourth drive means for rotating the finger unit (5a) is a hydraulic rotor (90).

16. A work changer as defined in claim 8, wherein the rotary unit (5a) further includes two locking means (87, 87a, 89, 92) for locking the second and third pairs of fingers (86a, 86b) so as to prevent them from disengaging the work holder (H).

17. A work changer as defined in claim 16, wherein each locking means includes a cam plate (87) movably located at a rear end of the fingers (86a), the plate (87) having two concave portions (87a) formed therein, two followers (89) cooperating with the cam plate (87), each fixed at one of the fingers (86a), and a cylinder means (92) for moving the cam plate (87).

* * * * *